(12) United States Patent
Zimmer et al.

(10) Patent No.: US 8,857,132 B2
(45) Date of Patent: Oct. 14, 2014

(54) ANCHOR INSTALLATION IN A LIGHTWEIGHT CONSTRUCTION PANEL

(76) Inventors: Günther Zimmer, Rheinau (DE); Martin Zimmer, Rheinau (DE)

(*) Notice: Subject to any disclaimer, the term of this patent is extended or adjusted under 35 U.S.C. 154(b) by 826 days.

(21) Appl. No.: 12/655,575

(22) Filed: Dec. 31, 2009

(65) Prior Publication Data
US 2010/0178130 A1  Jul. 15, 2010

Related U.S. Application Data

(63) Continuation-in-part of application No. PCT/DE2008/001097, filed on Jul. 3, 2008.

(30) Foreign Application Priority Data

Jul. 4, 2007 (DE) .......................... 10 2007 031 183

(51) Int. Cl.
| | | |
|---|---|---|
| E04C 2/54 | (2006.01) | |
| F16B 13/06 | (2006.01) | |
| F16B 13/02 | (2006.01) | |
| F16B 13/12 | (2006.01) | |
| F16B 5/02 | (2006.01) | |

(52) U.S. Cl.
CPC ............... *F16B 13/126* (2013.01); *F16B 13/02* (2013.01); *F16B 5/0208* (2013.01); *F16B 5/0258* (2013.01)
USPC ........................................ 52/787.1; 411/57.1

(58) Field of Classification Search
CPC .... F16B 37/043; F16B 19/1081; F16B 13/14; F16B 13/02; F16B 21/086; F16B 13/066; F16B 13/065; F16B 5/0642; F16B 13/00; F16B 13/124; F16B 13/126; F16B 13/0858; F16B 13/12; F16B 13/063; F16B 13/122; F16B 39/36; F16B 29/00; F16B 37/122; F16B 13/001; F16B 5/02; F16B 13/141; F16B 13/146; F16B 13/143; F16B 37/12; F16B 5/0092; F16B 37/067; F16B 5/01; F16B 4/004; F16B 35/041; F16B 19/02; B41J 29/02; E05D 5/023; E05Y 2600/622; B25B 27/143; B25B 15/008; B25B 31/005; B29C 70/58; G01N 3/32; A47F 5/0846; E21D 21/008; E04B 2002/7483; E04B 2/7437; E04B 2002/7487; E04B 2/78; E04B 2/7854; A47B 96/1416; E04C 2/365
USPC ........... 411/15, 44–45, 57.1–60.1, 80.2, 80.5; 52/36.5–36.6, 127.6, 223.7, 364, 704, 52/711, 745.21, 782.1, 783.1, 787.1, 705; 403/248, 370, 371, 408.1
See application file for complete search history.

(56) References Cited

U.S. PATENT DOCUMENTS

| | | | | |
|---|---|---|---|---|
| 3,042,156 | A * | 7/1962 | Rohe | ........................... 52/787.12 |
| 3,171,321 | A * | 3/1965 | Fischer | ........................ 411/80.5 |

(Continued)

FOREIGN PATENT DOCUMENTS

| | | |
|---|---|---|
| DE | 27 53 519 | 6/1979 |
| DE | 101 34 375 A1 | 1/2003 |

*Primary Examiner* — Gay Ann Spahn
(74) *Attorney, Agent, or Firm* — Klaus J. Bach

(57) ABSTRACT

In an anchor installation in lightweight construction panels including first and second cover plates with a support core structure disposed between the cover plates, wherein the anchor is installed in a bore extending through the first cover plate, the support core structure and into the second cover plate, the anchor includes engagement components firmly engaging the first cover plate, the intermediate support core structure and also the second cover plate so that the anchor is safely and firmly held in position in the lightweight construction panel.

9 Claims, 4 Drawing Sheets

(56) References Cited

U.S. PATENT DOCUMENTS

| | | | | |
|---|---|---|---|---|
| 3,175,455 A * | | 3/1965 | Reddy | 411/53 |
| 3,236,145 A * | | 2/1966 | Schenkel | 411/62 |
| 3,279,301 A * | | 10/1966 | Fischer | 29/522.1 |
| 3,461,772 A * | | 8/1969 | Barry | 411/80.1 |
| 3,471,183 A * | | 10/1969 | Fischer | 52/309.1 |
| 3,516,324 A | | 6/1970 | Berner | |
| 3,662,644 A * | | 5/1972 | Flesch et al. | 411/32 |
| 3,803,791 A * | | 4/1974 | Turnbull et al. | 52/506.05 |
| 3,808,938 A * | | 5/1974 | Chromy | 411/15 |
| 3,916,480 A * | | 11/1975 | Smith | 16/383 |
| 4,109,556 A * | | 8/1978 | Vollmer et al. | 411/57.1 |
| 4,135,432 A * | | 1/1979 | Schalge et al. | 411/80.6 |
| 4,235,150 A * | | 11/1980 | Nony | 411/80.5 |
| 4,235,151 A * | | 11/1980 | Udert et al. | 411/57.1 |
| 4,259,890 A * | | 4/1981 | Walsh | 411/80.2 |
| 4,653,132 A * | | 3/1987 | Yamada | 470/14 |
| 4,708,551 A * | | 11/1987 | Richter et al. | 411/32 |
| 4,760,495 A * | | 7/1988 | Till | 361/804 |
| 4,786,225 A * | | 11/1988 | Poe et al. | 411/32 |
| 4,800,643 A * | | 1/1989 | Higgins | 29/458 |
| 4,909,657 A | | 3/1990 | Maechtle | |
| 4,968,199 A * | | 11/1990 | Haage et al. | 411/39 |
| 4,978,265 A * | | 12/1990 | De Wan | 411/80.2 |
| 5,017,067 A * | | 5/1991 | Ohlin | 411/45 |
| 5,031,378 A * | | 7/1991 | Murphy | 52/747.1 |
| 5,080,543 A * | | 1/1992 | Murphy | 411/80.5 |
| 5,106,225 A * | | 4/1992 | Andre et al. | 403/408.1 |
| 5,263,510 A * | | 11/1993 | Heimann et al. | 137/359 |
| 5,628,579 A * | | 5/1997 | Forster | 403/297 |
| 5,688,066 A * | | 11/1997 | Loose | 403/297 |
| 5,746,557 A * | | 5/1998 | Kaibach | 411/54.1 |
| 5,791,846 A * | | 8/1998 | Mayr | 411/54.1 |
| 5,913,792 A * | | 6/1999 | Fischer | 52/698 |
| 5,993,129 A * | | 11/1999 | Sato | 411/80.6 |
| 6,702,534 B2 * | | 3/2004 | Filipp | 411/58 |
| 6,874,984 B2 * | | 4/2005 | Lin et al. | 411/57.1 |
| 7,147,419 B2 * | | 12/2006 | Balbo Di Vinadio | 411/182 |
| 7,150,595 B2 * | | 12/2006 | Liebig et al. | 411/60.3 |
| 7,357,613 B2 * | | 4/2008 | Houck et al. | 411/60.3 |
| 8,046,964 B2 * | | 11/2011 | Zimmer et al. | 52/364 |
| 2002/0076298 A1 * | | 6/2002 | Gauthier | 411/57.1 |
| 2002/0127081 A1 * | | 9/2002 | Filipp | 411/58 |
| 2004/0136802 A1 * | | 7/2004 | Lin et al. | 411/57.1 |
| 2004/0253075 A1 * | | 12/2004 | Liebig et al. | 411/57.1 |
| 2005/0147465 A1 * | | 7/2005 | Tiemann et al. | 403/408.1 |
| 2008/0038079 A1 * | | 2/2008 | Bobon | 411/57.1 |
| 2009/0019812 A1 * | | 1/2009 | Getz et al. | 52/704 |
| 2009/0214315 A1 * | | 8/2009 | Kelly et al. | 411/33 |
| 2009/0274533 A1 * | | 11/2009 | Zimmer et al. | 411/49 |
| 2009/0274534 A1 * | | 11/2009 | Zimmer et al. | 411/57.1 |
| 2010/0175345 A1 * | | 7/2010 | Zimmer et al. | 52/711 |
| 2010/0180535 A1 * | | 7/2010 | Zimmer et al. | 52/699 |
| 2010/0287875 A1 * | | 11/2010 | Zimmer et al. | 52/699 |
| 2010/0303575 A1 * | | 12/2010 | Bland et al. | 411/45 |
| 2010/0303576 A1 * | | 12/2010 | Armiento et al. | 411/45 |
| 2010/0303577 A1 * | | 12/2010 | Bland et al. | 411/57.1 |
| 2010/0303578 A1 * | | 12/2010 | Armiento et al. | 411/57.1 |
| 2011/0083397 A1 * | | 4/2011 | Zimmer et al. | 52/699 |
| 2011/0296788 A1 * | | 12/2011 | Cove et al. | 52/704 |
| 2012/0017421 A1 * | | 1/2012 | Bland et al. | 29/525.05 |

* cited by examiner

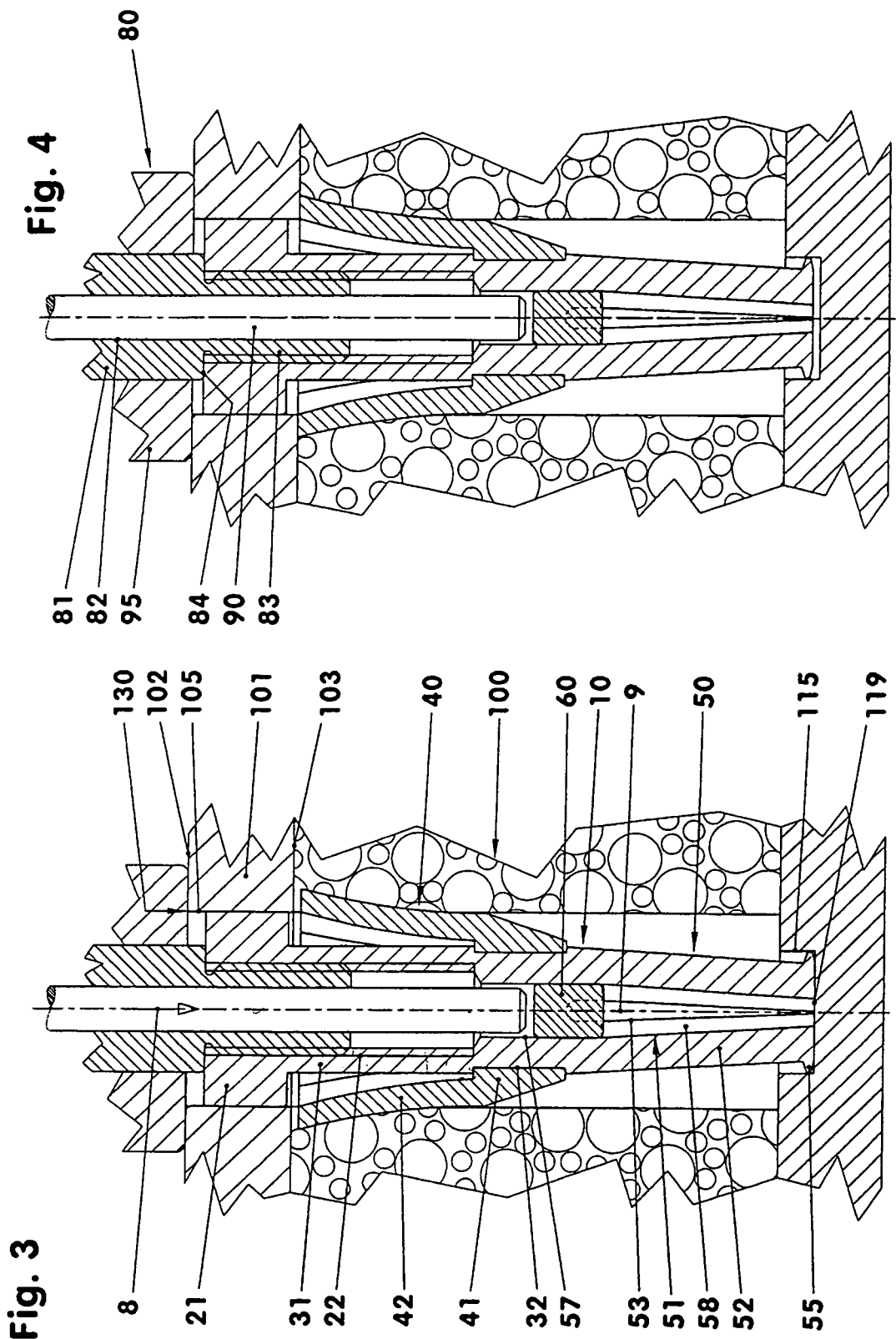

US 8,857,132 B2

ANCHOR INSTALLATION IN A LIGHTWEIGHT CONSTRUCTION PANEL

This is a Continuation-In-Part Application of pending international patent application PCT/DE2008/001097 filed Jul. 3, 2008 and claiming the priority of German patent application 10 2007 031 183.6 filed Jul. 4, 2007.

BACKGROUND OF THE INVENTION

The invention resides in an anchor installation in lightweight construction panels including a central support core covered by first and second cover plates wherein the anchor comprises at least one expansion body with mounting means and at least one wedge body movably disposed in the expansion body.

Flat lightweight construction panels with support cores are often also called sandwich panels, honeycomb panels or lightweight panels. All types of panels used in furniture construction have generally cover plates consisting of thin wood chip plates, medium- or high-density fiber plates, plywood or hard fiber plates. As central cores or support cores of the sandwich plates, sheets of foamed polyurethane or polystyrol are often used. In honeycomb plates as intermediate layers or, respectively, support cores, corrugated web inserts or so-called expanded honeycombs are used. Most lightweight panels have a density of less than 500 kg/m$^3$. If, for the intermediate layers, no fire-resistant aluminum foams or foamed glass is used, the density is generally less than 350 kg/m$^3$. For comparison, it is noted that the density of a regular woodchip plate is about 600 to 750 kg/m$^3$.

If armatures have to be attached to the lightweight panels for example by means of screws, it is a problem that the attachment means can be connected generally only to the relatively thin cover plates or cover layers. To resolve this problem, generally expansion anchors are used as they are disclosed for example in DE 20 2004 000 474 U1. This types of expansion anchor however have the disadvantage that they engage the top cover plate at opposite sides thereof over a large area. The rear engagement fingers displace the support core material in the area around the bore in which the anchors are accommodated whereby the cover plate is released easily from the support core material and lifted off when the anchor is subjected to pulling forces.

Another anchor which avoids this disadvantage is known from the internet brochure (September 2006) of the company Fischer Befestigungssysteme GmbH: It is offered herein under the designation SLM-N. The anchor has a tubular expansion body with a bore in part of which a wedge body is accommodated, which is frustro-conically shaped and has a slotted rear expansion body end. The wedge body has an internally thread central bore. When, for example by tightening a mounting screw disposed in the thread of the wedge body, the wedge body is pulled into the expansion body which is expanded into tight engagement with the lower part of the bore. However, this anchor could be tightly held only if the core support material would be very rigid.

It is the object of the present invention to provide an anchor for lightweight construction panels which is easy to install and can be safely and durably retained in the lightweight construction panel. It is not intended for mounting to solid panel inserts or the respective panel traverse members.

SUMMARY OF THE INVENTION

In an anchor installation in lightweight construction panels including first and second cover plates with a support core structure disposed between the cover plates, wherein the anchor is installed in a bore extending through the first cover plate, the support core structure and into the second cover plate, the anchor includes engagement components firmly engaging the first cover plate, the intermediate support core structure and also the second cover plate so that the anchor is safely and firmly held in position in the lightweight construction panel.

The anchor according to the invention is firmly retained in position within the construction panel with a high axial retaining force. It can be easily and safely installed manually as well as by means of an installation tool.

The invention will become more readily apparent from the following description of various embodiments thereof with reference to the accompanying drawings.

BRIEF DESCRIPTION OF THE DRAWINGS

FIG. 3 is a sectional view of the anchor shown in FIG. 1 with part of an installation tool disposed in the anchor, FIG. 4 is a view like FIG. 3 with the anchor slightly retracted.

DESCRIPTION OF PARTICULAR EMBODIMENTS

Figure 1:
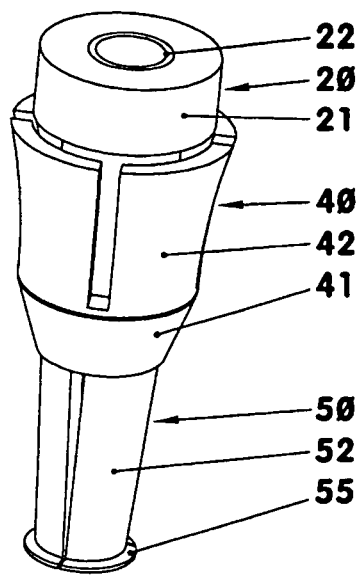
FIG. 1 is a perspective view of an anchor including a top plate engagement structure.
Figure 2:
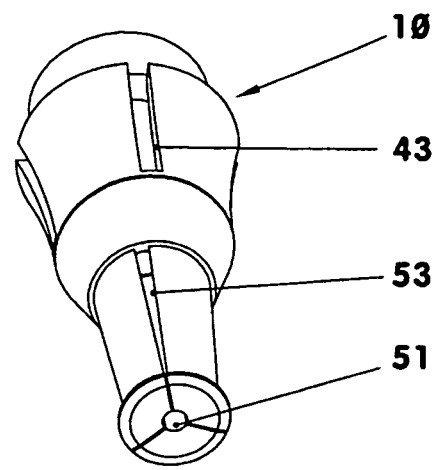
FIG. 2 is a perspective bottom view of the anchor shown in FIG. 1 as seen at an angle from below.

FIGS. 1 and 2 show an undeformed anchor. The anchor has an expansion body 10, which consists of three sections 20, 40, 50. An upper area is an engagement section 20 which comprises a cylindrical zone 21. The engagement section 20 is a sealing section which includes a central threaded bore 22 for accommodating mounting elements such as a screw 1, see FIG. 6. An intermediate area forms an engagement section 40, which, in the shown embodiment, comprises four retaining elements 42. The lower section 50 is a spreading section which includes for example three clamping elements 52.

Figure 6:
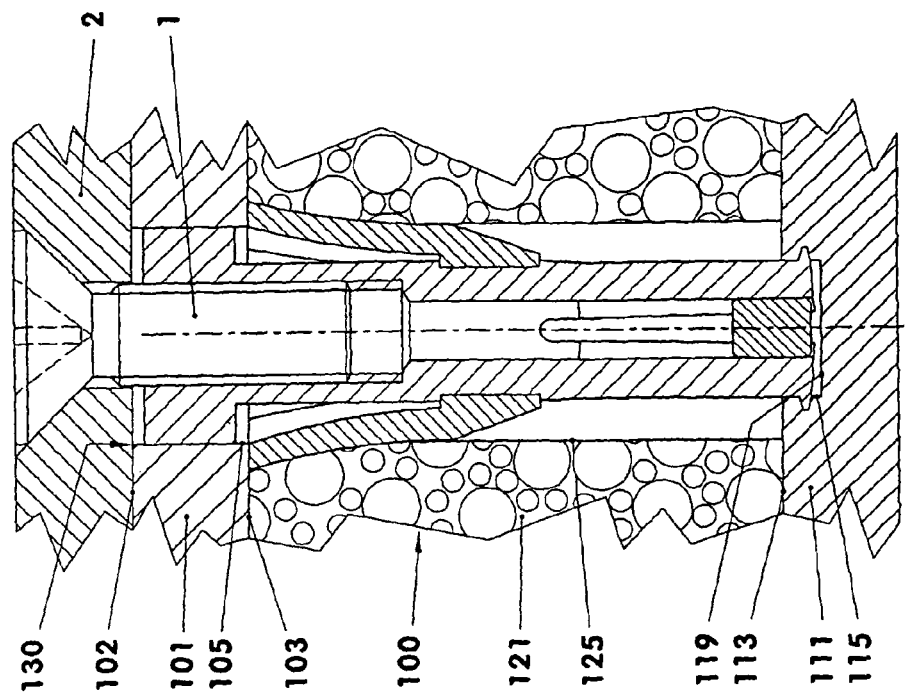
FIG. 6 is a view like FIG. 5 with an armature structure mounted.

The anchor is designed for example for mounting armature parts to lightweight construction panels 100 without reinforcement inserts or transverse members, see FIG. 6. The lightweight construction panel 100 comprises two cover plates 101, 111 and an intermediate support core 121. Each cover plate 101, 111 consists in the shown embodiment of a thin wood chip plate. The support core 121 in the present case is a PU (polyurethane) foam core. The cover plates 101, 111 are provided at their inner surfaces 103, 113 with the plate-like support core 121 which is cemented to the cover plates 101, 111. The lightweight construction panel as shown in the figures has a wall thickness of 20 to 40 mm. Each cover plate is 2 to 8 mm thick. Instead of the foamed core, it may include for example a honeycomb core. The lightweight construction panel is provided with a bore 130 which comprises the bore sections 105, 125, 115. The latter bore section 115 is a dead end bore. Its depth in the present case corresponds to 25 to 75% of the thickness of the lower cover plate 111. Possibly, in place of the dead end bore 115, a through-bore may be provided. For the type of anchor as shown in FIGS. 1 and 2, the dead end bore 115 may have a smaller diameter than the bores 105 and 125.

The lightweight construction panel 100 may also be curved, that is, it may be for example cylindrically or spherically curved as long as the material thickness of the support core 121 remains at least essentially constant.

For mounting an anchor, a bore is first drilled through the first cover plate 101 and the support core 121 of the lightweight construction panel. The dead end bore 115 is drilled into the second cover plate 111 to the desired depth. That is, no through-bore is provided in this example. As boring tool a spiral drill is used for example, which has a tip angle of 180°. Possibly, a spot facer may be used. Depending on the type of anchor, the bore 130 may also be drilled by a stepped drill, for example, if the dead end bore 115 in the lower cover plate 111 is to have a smaller diameter than the rest of the bore 105, 125, see FIGS. 4 to 6. The cavity or bore 130 formed thereby is cleaned out by compressed air or by a suction device.

FIG. 3 shows the anchor immediately after its insertion into the bore 130 of a light weight construction panel 100 using an anchor insertion tool 80. The anchor insertion tool 80 comprises at least a holding tube 81, a spreading plunger 90 and a downholder 95, see FIG. 4.

The holding tube 81 is for example a tubular component which has a through-bore 82 and which is provided at its front end with a threaded section 83. For accommodating the anchor, the threaded section 82 is threaded into the threaded bore 22 of the anchor. In connection with anchors whose central bores are not threaded, the holding tube 81 engages the anchor within the central bore for example via frictional engagement elements.

Alternatively, the bore 22 may be a passage with a rectangular, an oval-, a polygonal- or star-like cross-section for accommodating non-metric screws such as wood chip board screws or wood screws. If expedient, the cross-section of the bore 22 becomes smaller toward the end of the bore. Retaining elements are available for all types of bores.

In the bore of the holding tube 81, the spreading plunger 90 is axially movably supported. The holding tube 81 is itself axially movably disposed in the downholder 35.

The holding tube 81 includes a shoulder 84 by way of which it is seated on the upper front face 21 of the anchor. The downholder 95 abuts the outer surface 102 of the lightweight construction panel 100.

The anchor is shown in FIG. 3 disposed with its cylindrical zone 21 in the bore 105. Adjacent the cylindrical zone 21, the anchor is provided with a tubular section 31. The tubular section 31 is provided with an annular groove 32 and is surrounded by the engagement section 40.

The engagement section 40 comprises a ring 41 from which, in this case, four retaining elements 42 extend which are integrally formed with the ring 41. The ring 41 is accommodated in the annular groove 32, which has a depth of 0.1 to 0.3 mm and in which the ring 41 is axially and radially fixed in a force and form-locking manner. The ring 41 narrows down, cone-like, toward the spreading section 50. The elastic engagement elements 42 are spread outwardly in a curved manner—as shown in section in FIG. 3. They end shortly below the cylinder zone 21. Their maximum outer diameter is for example 2 to 3 mm greater than the inner diameter of the bore 105. The engagement elements 42 are separated by longitudinal slots 43, see FIG. 3. The side walls of the engagement elements 42, that is, the wall sections adjacent the longitudinal slots 43 are disposed for example in planes in which also the center line 9 of the anchor is disposed.

The threaded bore section 22 of the cylinder zone 21 continues within the tubular section 31. The tubular section 31 has an outer radius which is smaller than the difference between the radius of the cylinder zone 21 and the wall thickness of the engagement element 42.

Below the annular groove 32, there is the spreading section 50 which narrows down, cone-like, toward the bottom 119. In the spreading section 50, there is a bore 51, which is cylindrical in the area of the outer annular groove 32, but is frustro-conical below this area. In the frustro-conical area, the spreading section 50 includes axial slots 53, three slots in FIG. 2, for forming three clamping elements 52. The axial slots 53 become narrower toward the bottom. Expediently, the side walls of the clamping elements 52 are oriented, at least in areas thereof, similar like the side walls of the engagement element 42.

The axial slots 53 are angularly spaced by 120°. They may also be spirally-, accordion-, or scallop-shaped. For avoiding stress concentrations, the axial slots 53 may end in radial rounded openings.

The lower end of the bore 51 in accordance with FIG. 3 has an inner diameter which is smaller than half the inner diameter of the cylindrical area 57 of the bore 51.

At the lower end of the spreading section 50, a radially projecting web 55 is provided. The circumferentially extending web 55 is interrupted by the axial slots 53. The web 55 has for example a radial height of about 0.3 to 1 mm. The maximum diameter of the web 55 is less than the inner diameter of the ring 41 when the clamping elements 52 are pressed together. In this way, the ring part 41 with the engagement elements 42 can be slipped onto the expansion body 10 from below.

Alternatively, in place of the web 55, a one- or multi-pitched thread, a circumferential corrugation or a burl structure, may be provided.

Figure 5:
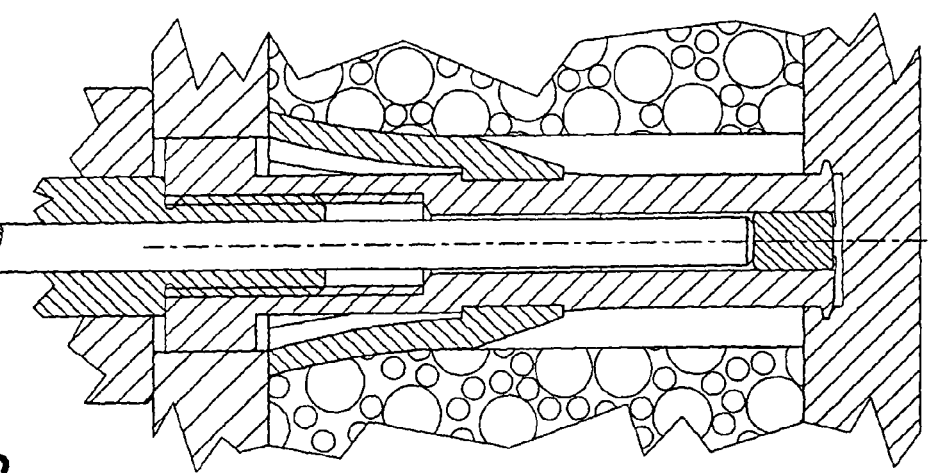
FIG. 5 is a view like FIG. 4 showing a wedge body moved to the end of the anchor.

FIG. 3 shows a wedge body 60; see also FIGS. 4-6. The wedge body 60 is a cylindrical component which is disposed in a cylindrical section 57 of the bore 51 before the anchor is installed. At its cylindrical outer surface, engagement notches or similar structures may be provided which extend into corresponding engagement recesses of the bore 51. In this way, the wedge body 60 can be safely locked in certain positions.

The wedge body 60 may also be in the form of a ball. The expansion body 10 and the wedge body 60 consist of a plastic material such as for example polyamide.

FIG. 3 shows the expansion body 10 after a first insert movement step into the bore 130. Herein, the expansion body 10 is moved into the bore 130 to such an extent that it comes into contact with the bottom 119 of the bore 115 or is slightly spaced therefrom. In this way, it is made sure that the retaining elements 42, which are pressed radially against the tubular section 31 when they are pushed through the bore section 105, are released after passing through the upper cover plate 101 and automatically are again spread apart away from the tubular section 31.

When the retaining elements 42 are spread apart, the expansion body 10 is moved by the holding tube 81 in a direction opposite the installation direction 8 in order to move the upper surface or the edges of the retaining elements 42 in contact with the lower surface 103 of the upper cover plate 101. During this step, the anchor holding tool 80 abuts the outer surface 102 via the downholder 92, see FIG. 4. The front face 23 of the expansion body 10 is then disposed slightly below the outer surface 102 of the cover plate 101.

In a further assembly, step, the clamping elements 52 of the expansion body 10 are engaged in the dead end bore 115. To this end, the spreading plunger 90 is moved against the wedge body 60 while the anchor insertion tool 80, that is the downholder 95 and the holding tube 81, are stationary relative to each other, in order to move the wedge body downwardly in the installation direction 8. As soon as the wedge body 60 reaches the frustroconical area 58 of the bore 51, which becomes downwardly narrower, the clamping elements 52 are spread essentially radially outwardly. In this way, the various sections of the webs 55 firmly engage the wall of the dead end bore section 115. The clamping procedure is completed only when the wedge body 60 has reached the lower end of the expansion body 10, see FIG. 5. The bore 51 now has an essentially cylindrical form. The clamping elements 52 are now spread apart as much as possible, see FIG. 6. The anchor is then firmly installed in the lightweight construction panel 100.

Subsequently, the downholder 90 is retracted, the holding tube 81 is screwed out of the threaded bore 22 and the anchor installation tool 80 is moved away from the lightweight construction panel 100.

In FIG. 6, an armature 2 is shown mounted to the lightweight construction panel 100. The armature is screwed, by means of a flat-head screw 1, to the anchor or, respectively, the expansion body 10, which is firmly engaged in the lightweight construction plate 100.

Figure 7:
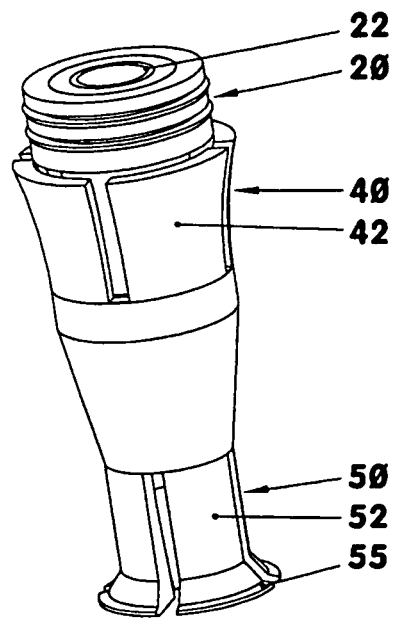
FIG. 7 is a perspective view of the anchor viewed at an angle from above with an engagement structure formed onto the anchor.
Figure 8:
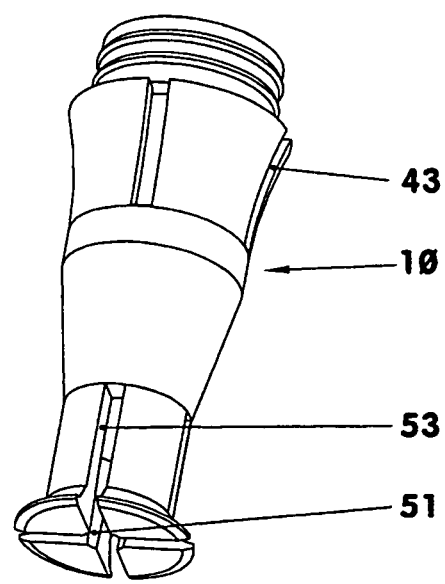
FIG. 8 is a view like FIG. 3 seen at an angle from below.

FIGS. 7 and 8 also show an undeformed anchor with an expansion body 10, which has at least three sections 20, 40, 50. However, this anchor is designed for a bore 130 whose three sections 105, 125, 115 have all the same diameter.

Figure 10:
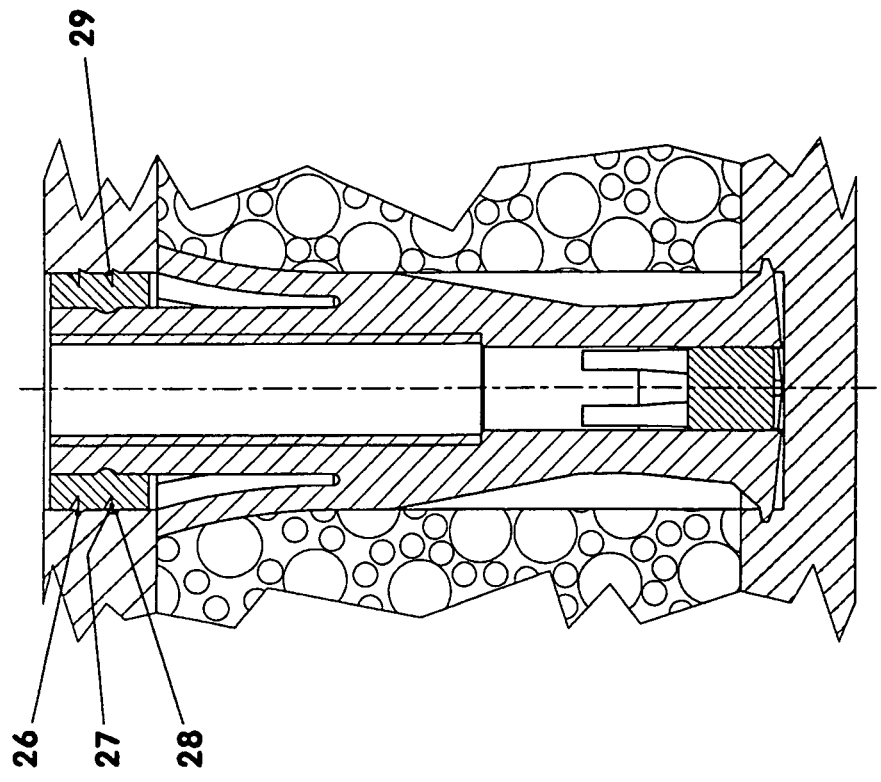
FIG. 10 is a cross-sectional view of the anchor with the lower end expanded by the wedge member.
Figure 9:
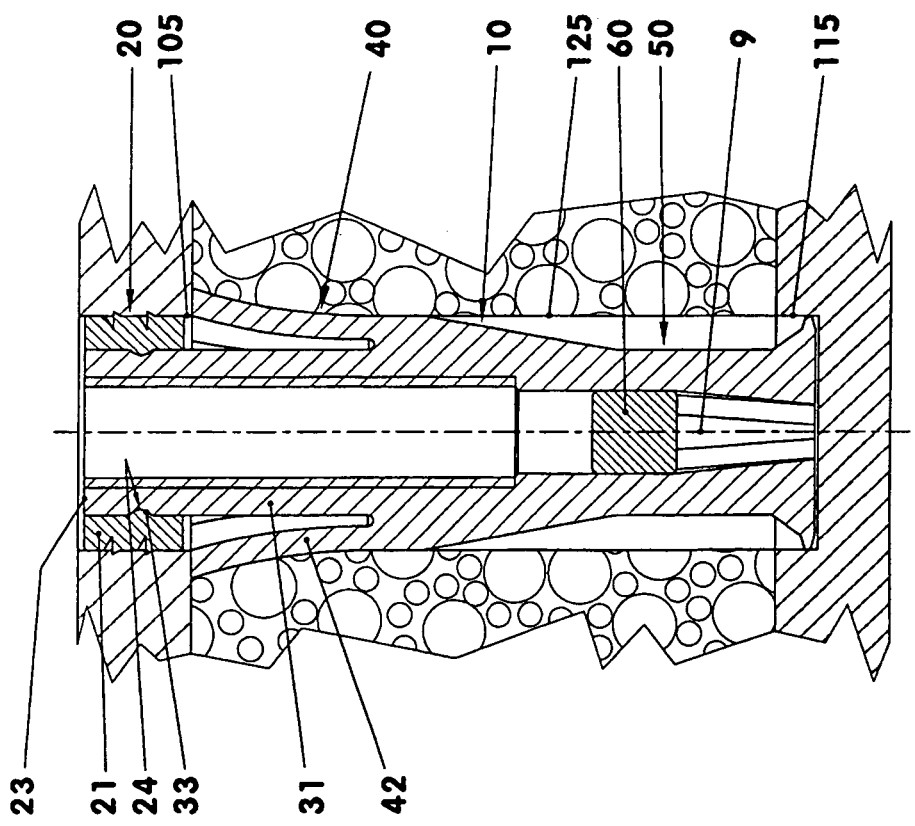
FIG. 9 is a cross-sectional view of the anchor shown in FIG. 7 with the inner end of the anchor not yet expanded.

As shown in FIGS. 9 and 10, the expansion body 10 includes in the seating section 20 a pre-installed cylindrical zone 21. In this variant, the tubular section 31 ends at the upper front face 23 of the expansion body 10. Between the front face 23 and the top side of the retaining element 42, a circumferential groove 33 is provided on the outside wall of the tubular section 31. An accurately fitted circumferential web 24 of the cylindrical zone 21 is received in this groove for axially fixing the cylindrical zone 21 to the tube section 31.

The cylindrical zone 21 includes here two barbed webs 26 which also extend circumferentially. The closed annular barbed webs 26 have a triangular cross-section—see FIGS. 9 and 10—with a support flank 27 and a slide flank 28. They project for example 0.15 mm beyond the adjacent cylinder outer contour. Above each barb 26, there is a circumferential annular channel 29, which also has a triangular cross-section. Each individual annular channel is so formed that the surface area of the support flank 27 is enlarged. The contour of the annular channel 29 and barbed web 26 is z-shaped. With this special contour, the barbed webs 26 are more resilient in the impression direction.

The barbed webs 26 provide for a rotation-resistant engagement of the expansion body 10 in the bore 105. Additionally, they seal the mounting gap between the expansion body 10 and the lightweight construction panel 100 so that, there, neither dirt nor moisture can enter. It also prevents support core material from reaching the ambient.

Alternatively, the sealing section 20 may include a plurality of longitudinal webs. All webs extend parallel to the centerline 9 of the anchor. Also, in this case, each web may have for example a triangular cross-section with flanks extending at an angle of 90° relative to each other. The cross-section of the webs may become smaller toward the bottom end. This increases the tightness of the mounting gap.

As shown in FIGS. 9 and 10, the engagement section 40 with its retaining elements 42 is an integral part of the expansion body 10. The retaining elements 42 have a shape as described already in the variant of FIGS. 3 and 4.

In wood furniture construction, the mounting stability of an armature connection depends not only on the pull-out resistance of the screws disposed in the anchors, but also on the limitations of the setting amount and the avoidance of play in a direction transverse to the center axis of the respective screw. The anchor presented herein is supported in a direction transverse to its centerline 9 on one hand via the cylindrical zone 21 in the bore 105 of the first cover plate 101 and, on the other hand, it is firmly engaged via its spreading section 50 in the second cover plate 111. For these reasons, increased retaining forces are generated. First, the lower cover plate 111 takes on part of the anchoring forces by the engagement of the spreading section 50 in the bore 115. Second, the anchor is fixed in a form- and force-locking manner with respect to its position transverse to the center axis 9 of the anchor at its opposite axial ends. Furthermore, since the anchor is of rigid, that is, not bendable, design, the screws are fixed in their orientation in the anchor and not subjected assure inclined positions which might lead to their release so that the chances of unintended loosening of the armature is minimized or prevented.

In the shown embodiments, the wedge body has generally a rotationally symmetrical contour. However, at least part of it may have a square, polygonal oval or otherwise profiled cross-section. The wedge body 60 may also be connected to the expansion body 10 for example via a thread so that the wedge body 60 can be mounted by threading movement rather than a linear insertion movement.

Of course, the inventive concept is not limited to anchors with at least partially cylindrical outer contours. The anchor may also be designed for openings with at least partially elongated or oval cross-sections.

| Listing of Reference Numerals |
| --- |
| 1 Mounting means, screw |
| 2 Armature |
| 8 Installation tool |
| 9 Centerline of anchor |
| 10 Expansion body |
| 20 Seating section |
| 21 Cylinder zone |
| 22 Threaded bore section |
| 23 Upper front face |
| 24 Circumferential web |
| 26 Barbed web |
| 27 Support flank |
| 28 Slide flank |
| 29 Annular channel |
| 31 Tubular section |
| 32 Annular groove |
| 33 Groove |
| 40 Engagement section |
| 41 Ring part |
| 42 Retaining part |
| 43 Longitudinal slots |
| 50 Spreading section |
| 51 Support bore |
| 52 Clamping elements |
| 53 Axial slots |
| 55 Web |
| 57 Cylindrical section of 51 |
| 58 Frustroconical area of bore 51 |
| 60 Wedge body |
| 80 Anchor insertion tool |
| 81 Holding tube |
| 82 Through bore |
| 83 Threaded section |
| 84 Shoulder |
| 90 Spreading plunger |

| Listing of Reference Numerals | |
|---|---|
| 95 | Downholder |
| 100 | Lightweight construction panel |
| 101 | Upper cover plate |
| 102 | Outer surface |
| 103 | Inner surface |
| 105 | Bore section |
| 111 | Lower cover plate |
| 113 | Inner surface |
| 115 | End bore section |
| 119 | Bottom |
| 121 | Support core, honeycomb core, foam material core |
| 125 | Bore section |
| 130 | bore |

What is claimed is:

1. An anchor for installation in a lightweight construction panel (100) including first and second spaced hard-material cover plates (101, 111) with a support core structure (121) disposed between the first and second cover plates (101, 111), the anchor being insertable into a support bore (130) formed in the construction panel (100) so as to extend through the first cover plate (101) and through the support core (121) and into a dead end bore (115) extending into the second cover plate (111), said anchor comprising an expansion body (10) including a mounting means and a wedge body (60) movably disposed in the expansion body (10), the expansion body (10) having an upper seating section (20) with an essentially cylindrical zone (21) for accommodation at least partly in a bore section (105) of the support bore (130) extending through the first cover plate (101), an intermediate area forming an engagement section (40) with at least two integral elastically inwardly flexible engagement elements (42) formed at the upper end thereof and a lower area forming a spreading section (50) with at least two clamping elements (52) extending downwardly for accommodation in the dead end bore (115) of the second cover plate (111), said wedge body (60) with the anchor uninstalled being disposed in an accommodation section next to a downwardly narrowing cavity (51) formed in the expansion body (10), said anchor, when inserted into the support bore (130) being in engagement at its top with the first cover plate (101), with the engagement elements (42) being spread out behind the first cover plate (101) in contact with the first cover plate (101) and the clamping elements (52) being spread apart by the wedge body (60) moved into the narrowing cavity (51) into firm radical engagement with the second cover plate (111).

2. The anchor according to claim 1, wherein the expansion body (10) includes a central threaded bore (22) for receiving a mounting member (1).

3. The anchor according to claim 1, wherein the engagement section (40) is a separate component attached to the expansion body by form-locking engagement therewith.

4. The anchor according to claim 1, wherein the bore (51) formed in the expansion body (10) for guiding the wedge body (60) includes a cylindrical section (57) and a frustro-conical section (58).

5. The anchor according to claim 1, wherein the wedge body (60) has a cylindrical shape.

6. The anchor according to claim 1, wherein the expansion body (10) is provided with axial slots (53) for forming the clamping elements (52) in the spreading section (50).

7. The anchor according to claim 1, wherein the cylindrical zone (21) of the expansion body (10) disposed in the bore (105) is provided with a surface structure (26) preventing rotation of the anchor when the anchor installed in the construction panel.

8. The anchor according to claim 1, wherein the seating section (20) is a component attached to the expansion body (10) in a form-locking manner.

9. The anchor according to claim 1, wherein the end bore (115) in the second cover plate (111) is a dead end bore.

* * * * *